United States Patent
Hilz

(10) Patent No.: US 9,380,461 B2
(45) Date of Patent: Jun. 28, 2016

(54) APPARATUS FOR DISCREET COMMUNICATION FOR A MOBILE COMMUNICATION DEVICE

(76) Inventor: Max Hilz, Spiegelau (DE)

( * ) Notice: Subject to any disclaimer, the term of this patent is extended or adjusted under 35 U.S.C. 154(b) by 144 days.

(21) Appl. No.: 13/822,493

(22) PCT Filed: Nov. 18, 2011

(86) PCT No.: PCT/EP2011/070415
§ 371 (c)(1),
(2), (4) Date: May 29, 2013

(87) PCT Pub. No.: WO2012/097898
PCT Pub. Date: Jul. 26, 2012

(65) Prior Publication Data
US 2015/0195709 A1    Jul. 9, 2015

(30) Foreign Application Priority Data

Jan. 20, 2011 (DE) .......................... 10 2011 002 903

(51) Int. Cl.
| | |
|---|---|
| H04M 1/66 | (2006.01) |
| H04M 3/42 | (2006.01) |
| H04W 12/06 | (2009.01) |
| H04L 12/58 | (2006.01) |
| H04M 1/663 | (2006.01) |
| H04W 12/02 | (2009.01) |
| H04B 1/3816 | (2015.01) |
| H04W 4/12 | (2009.01) |
| H04L 29/06 | (2006.01) |

(Continued)

(52) U.S. Cl.
CPC ............. *H04W 12/06* (2013.01); *H04B 1/3816* (2013.01); *H04L 12/587* (2013.01); *H04L 51/24* (2013.01); *H04M 1/663* (2013.01); *H04M 1/72577* (2013.01); *H04M 3/42042* (2013.01); *H04W 4/12* (2013.01); *H04W 12/02* (2013.01); *H04L 63/0861* (2013.01); *H04M 1/72566* (2013.01); *H04M 1/72572* (2013.01); *H04M 3/42059* (2013.01); *H04M 3/436* (2013.01); *H04W 8/26* (2013.01); *H04W 24/00* (2013.01); *H04W 88/02* (2013.01)

(58) Field of Classification Search
None
See application file for complete search history.

(56) References Cited

U.S. PATENT DOCUMENTS

2005/0201362 A1* 9/2005 Klein et al. .................. 370/352
2007/0206747 A1* 9/2007 Gruchala ................ H04M 3/38
379/142.01

(Continued)

OTHER PUBLICATIONS

Search Report for PCT Patent Application No. PCT/EP2011/070415 issued May 21, 2012.
"Advanced Productivity Pack" Melon Mobile, Dec. 17, 2010.
"Call Control" Melon Mobile, Dec. 17, 2010.

*Primary Examiner* — Erika A Washington
(74) *Attorney, Agent, or Firm* — Meyertons, Hood, Kivlin, Kowert & Goetzel, P.C.; Eric B. Meyertons

(57) ABSTRACT

Apparatus for a mobile communication device, comprising means for detecting a unique subscriber identification of an incoming communication, means for storing the incoming communication into a protected area of the mobile communication device, if the subscriber identification fulfills at least one specific criterion, means for putting through incoming communication, if at least one specific criterion is fulfilled; and wherein the at least one criterion for storing and/or putting through the incoming communication is based on a detection of the frequency of contact and/or a time and/or a location.

14 Claims, 3 Drawing Sheets

Figure 1:
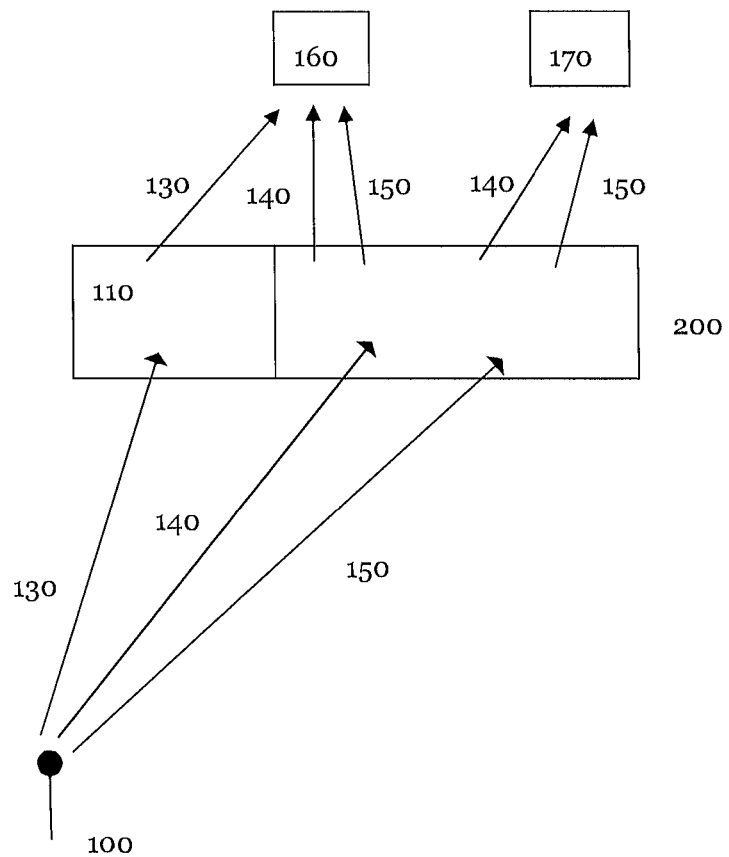

(51) Int. Cl.
*H04M 1/725* (2006.01)
*H04M 3/436* (2006.01)
*H04W 8/26* (2009.01)
*H04W 24/00* (2009.01)
*H04W 88/02* (2009.01)

(56) References Cited

U.S. PATENT DOCUMENTS

2009/0088168 A1 4/2009 Varanasi
2010/0074420 A1 3/2010 Bauchot et al.

* cited by examiner

APPARATUS FOR DISCREET COMMUNICATION FOR A MOBILE COMMUNICATION DEVICE

1. FIELD OF THE INVENTION

The present invention relates to an apparatus for mobile communication for protecting confidential information and for achieving selective availability.

2. PRIOR ART

Being constantly "online" is nowadays nearly mandatory—be it in business or private life. For instance, being available anytime and anywhere is important for business people. Also other professions such as physicians need to be permanently available. Even individuals feel the urge of being permanently "online". As a result, many people always carry a mobile communication device, e.g., a cellular phone or smartphone. However, mobility also bears risks. One frequent problem of being permanently available can be seen in the negative aspect of also being available to unwanted persons. For instance, during office hours one wants to be reachable by phone for costumers or colleagues but possibly not for any private communication. Further, one may feel annoyed by advertising phone calls or even harassing phone calls. Moreover, permanent availability could also result in lack of concentration, reduced job performance or may even lead to severe mental stress.

Another problem arises from loss of the cell phone or from spying, which could lead to drastic personal and financial damages. For instance, confidential business information could become public. Similarly, private information could become public and, as a result, lead to disadvantages for the owner of the information.

To this end, the European patent application EP 2 017 767 discloses a method for avoiding the loss of confidential information by moving data from a mobile telephone into a certain memory unit, e.g., by using a USB-connection or a network.

The International patent application WO 2009/098289 relates to a method for filtering incoming and outgoing calls, respectively, based on a "subscriber identity module" (SIM-card). By using a comparison, or filtering module, respectively, a command may be issued via the SIM-card which then cuts the connection off the telephone network.

Moreover, call filters are known which are based on a so called white-list and black-list mechanism, respectively. This means that calls originating from a telephone number that is stored in a white-list are put through, while calls from a telephone number stored on a black-list are blocked or rejected. Furthermore, it is known that different phone numbers may be assigned to different ring tones or symbols to be displayed on the phone.

The US patent application 2010/0074420 relates to a management system for calls which uses a white-list and a black-list, respectively. Caller IDs which are on the black-list are rejected or redirected to the voicemail. Caller IDs which are on the white-list are requested to input a password. If the password is correct the ringing function is activated.

The software manual "Kaspersky Mobile Security 9" discloses a function called "privacy" which prevents unauthorized data access by third persons. Data and events related to specific numbers are hidden. Moreover, black-list and white-list filtering mechanisms are disclosed.

The methods known from prior art are disadvantageous. For instance, it is desirable to store information depending on different criterions such that the information is always secured. Moreover, a simple black-white-mechanism which is based on a simple filtering is rather inflexible since it only allows very imprecise parameters to be set, e.g., it may only allow filtering based on the phone number.

It is therefore the technical problem underlying the present invention to provide an apparatus that overcomes the above discussed deficiencies at least in part.

3. SUMMARY OF THE INVENTION

The above problem is solved according to a first aspect of the invention by an apparatus for mobile communication comprising means for detecting a unique subscriber identification of an incoming communication. Moreover, the apparatus comprises means for storing the incoming communication in a protected area of the mobile communication device if the subscriber identification fulfills at least one specific criterion. Further, the apparatus comprises means for putting-through incoming communication if at least one specific criterion is fulfilled and wherein the at least one criterion for storing and/or putting-through of the incoming communication is based on a detection of the frequency of contact and/or a time and/or a location.

Thereby, the user may define a certain profile that protects data stored on the device from unauthorized access. This also applies if the mobile communication device is active and particularly if there is no PIN-code required for using the mobile communication device. The protected area of the device therefore provides an additional and protected communication layer which is only accessible by the authorized user. Usually not all incoming calls, messages or contacts are confidential. To this end, the present invention offers the possibility of moving incoming communication into the protected area or to directly store the information into the protected area if at least one criterion is fulfilled, and wherein this criterion depends on the subscriber ID. In particular, the protected area is hidden from normal users and can therefore only be accessed by authorized users. The access could be granted, e.g., depending on a specific code, a finger print, an eye-scan or other security checks. In this way, confidential information may be stored into the protected area so that no unauthorized third party (e.g., thieves) can access and view this information.

Usually, information arriving at a mobile communication device cannot only be divided into confidential and non-confidential messages. Rather, there are many undesired messages or calls, such as advertising calls or generally any other kind of unwanted contacts. On the other hand, certain contacts may always be welcome, e.g., calls or messages of specific business partners or family members. The apparatus according to the present invention allows putting through communication if the communication fulfills a specific criterion. Hereby, it is further possible to store the communication into the protected area or to directly display the information on a mobile communication device in accordance with the above-mentioned features.

It is conceivable that a caller is unknown prior to the incoming call but he or she may still have an important message. In such case the apparatus according to the present invention could forward the communication after multiple contact attempts. In this way, also previously unknown callers could provide information to the recipient. On the other hand, communication attempts may also be rejected if they occurred too often, e.g., at least for a certain time period, in order to avoid any disturbance. Another advantage arises from the determination of the time and/or the location. For instance, calls originating from a certain region could be forwarded if there is an increased number of communication attempts. It is also possible to forward the communication only after a previously agreed number of connection attempts.

Preferably, the subscriber identification is a telephone number. Usually any incoming communication is identified by the telephone number. Thus, determining whether the incoming communication is confidential or not can be based on the telephone number. As a consequence, a message could be automatically moved into the protected area, preferably without displaying the incoming message at the mobile communication device. However, different subscriber identifications are also conceivable.

Preferably, the incoming communication is a phone call. Incoming phone calls are usually displayed on the mobile communication device. For instance, the incoming call could be indicated by displaying the telephone number or the name of a contact that is linked with that telephone number. However, even displaying information about such attempted contact could result in disadvantages for the called person. The apparatus underlying the present invention allows detecting the incoming phone call prior to any display on the mobile communication device. In this way, any contact attempt could be directly moved into the protected area. As an example, there is no display of incoming communication, even after the incoming communication has been moved into the protected area. In this case, the confidential communication could only be viewed by accessing the protected area. As another example, some inconspicuous signal could hint to the incoming communication or the information that has already been stored into the protected area, respectively. For instance, some inconspicuous symbol on the display or a flashing light signal on the mobile communication device may be used (e.g., a LED or even an audio signal).

According to a further aspect of the present invention, the incoming communication is a short message. Short messages can be text only messages (e.g., SMS), but they may also comprise multimedia information such as images, videos or voice signals (e.g., MMS). Incoming short messages can usually be accessed by anyone who has access to the mobile communication device. Thus, neither the content nor the sender of the short message is protected. This could lead to substantial disadvantages for the actual recipient of the message. The present invention solves this problem by identifying the subscriber identification of the incoming short message. Preferably, there is no display of the incoming communication prior to storing the data into the protected area. In this way, there is no hint to a short message that has been stored and therefore unauthorized third people cannot become suspicious. In a further example, the short message is a SMS (short message service) which only comprises text. In still another example it could be any other type of a short message, e.g., a MMS (multimedia messaging service). These messages comprise multimedia signals, e.g., images, videos and/or voice signals. Different types of short messages are also conceivable.

In a preferred embodiment, the access to the protected storage area is protected by a password. Another advantage of the present invention can be seen in that the protected area is not only protected by not showing its content but additionally by an arbitrary password. That increases the security which is particularly important for confidential information comprising trade secrets or personal secrets.

According to a further aspect of the present invention, the access to the protected storage area can be protected by a finger print. Increased security could be achieved by protecting the protected storage area by a finger print. Since finger prints are unique, only the authorized person may access the protected area. Other biometric methods such as Iris recognition, identification of the hand-writing or gestures, as well as voice-input of a code word are also conceivable.

Preferably the protected storage area further comprises a folder for voice-messages. Oftentimes callers leave a short message when they cannot reach the called person in person. The present invention allows storing this message into the protected area without any notification of the activity of the mobile communication device to any third person. This improves the security over conventional folders or mailboxes for voice messages ("mailbox") as conventional means can generally be monitored by anyone who has access to the mobile communication device. Moreover the present invention avoids any hint to the incoming message on the mobile communication device.

Preferably, the apparatus further comprises means for detecting a unique subscriber identification of an outgoing communication and means for storing the outgoing communication into a protected storage area of the mobile communication device if the subscriber identification fulfills at least one specific criterion. Thus, it is also possible to initiate communication from within the protected storage area of the mobile communication device so that outgoing communication is not visible to unauthorized third persons. For instance, short messages that have been sent could directly be stored into the protected storage area so that no unauthorized person could become aware of this communication. Moreover, there would be no hint to private calls. As a result, incoming as well as outgoing communication can be protected from unauthorized access if the communication fulfills the criterions for storing the information into the protected area.

Preferably the at least one criterion for storing and/or putting through the incoming communication depends on a time and/or a date. The present invention allows to decide whether to store incoming communication into the protected storage area, whether to put the caller through or whether to reject the communication depending on the time of the day or of the date. According to one aspect, the adjustment of time and/or date may only be made by an authorized user. Access may be gained by the methods described herein, e.g., using a code, biometric methods and so on. This offers various advantages. Usually one does not want to be contacted by certain persons during evenings or at weekends or during the day, e.g., by relatives. Moreover, it is conceivable that certain rules may be defined for holidays and for incoming communication from various contacts.

Preferably the at least one criterion for storing and/or putting through the incoming communication depends on the location of the receiving mobile communication device. In one example, availability may be controlled by an authorized user as explained herein in more detail. Data connections or telephone calls to foreign countries are rather expensive. The present invention allows to reject incoming communication without creating any costs if the connection identification fulfills a specific criterion. The respective location of the device could be determined based on different well-known methods. For instance, the location may be determined based on one or more radio cells to which the mobile communication device is connected. Moreover, determination of the location by using GPS signals would also be conceivable. Another option would be defining a specific reception area, e.g., a distance from a specified location. As an example, incoming or outgoing communication could only be allowed if the receiving participant is located within a specific distance. It is also conceivable to make a decision based on the duration the mobile communication device is at a specific location.

According to a preferred embodiment, a message is sent to the other participant. If the incoming communication is rejected or stored into the protected storage area it may be reasonable to inform the sender or the recipient accordingly. For instance, the message could inform the sender or the recipient, respectively, that the communication, e.g., SMS, MMS, has been stored confidentially and therefore may be read at a later point in time. Moreover, it is conceivable to inform the sender or the caller, respectively, that the communication attempt has been rejected and why it has been rejected. For instance, the message may indicate a stay abroad or ongoing business dates or other events that do not allow instant response. Moreover, such message could further serve as confirmation to the sender. Another option would be sending a signal instead of a message, e.g., an automatic response in terms of a graphical symbol could be sent. According to another example, fetching the message by the authorized user could be indicated to the sender of the respective message. For instance, a short message may be sent.

Preferably, the at least one criterion for storing and/or putting through the incoming communication may be based on a priority classification. Different groups of persons may be assigned different priorities. As an example, relatives may be assigned a particularly high priority. As a result, all connection attempts would be put through. Contacts that are assigned a different priority might only be put through during week days between 7 A.M. and 7 P.M., while persons that are assigned to another group could be put through only during spare time, e.g., at weekends. In this way, the information overload could easily be controlled by the recipient of the respective data but not by the sender of the data.

According to another aspect of the present invention the apparatus is not located on the mobile communication device itself. In conventional systems a mailbox is offered by the provider, e.g., on dedicated servers. It is possible to realize the invention in a similar way wherein a conventional mailbox would be adapted according to one or multiple of the aspects mentioned herein. According to another example, it is also possible to prepare an additional mailbox so as to realize the aspects of the present invention. This may also be controlled by the user via the mobile communication device. Such solution would require less power at the mobile communication device as any communication is already intercepted and processed before it even reaches the recipient. Fetching the information stored in protected storage areas could then be arranged from the mobile communication device as well as the configuration of the desired criterions. Moreover, these features allow to store incoming communication into a protected area even if the mobile communication device is switched off. The additional mailbox could be controlled by any authorized user using any type of access code as disclosed herein.

Preferably, the apparatus is further adapted to limit outgoing communication based on time and/or area code and/or blocked subscriber identifications and/or the frequency of contact and/or the duration. Restricting outgoing communication attempts offers various advantages. On one hand parents could limit the use of the mobile communication devices by their children. Moreover it is possible to block only specific connection identifications or area codes.

According to another aspect of the present invention the problem is also solved by a computer program for a mobile communication device which comprises means for detecting a unique subscriber identification of an incoming communication and means for storing the incoming communication into a protected area of the mobile communication device, if the subscriber identification fulfills at least one specific criterion.

4. SHORT DESCRIPTION OF THE FIGURES

Figure 2:
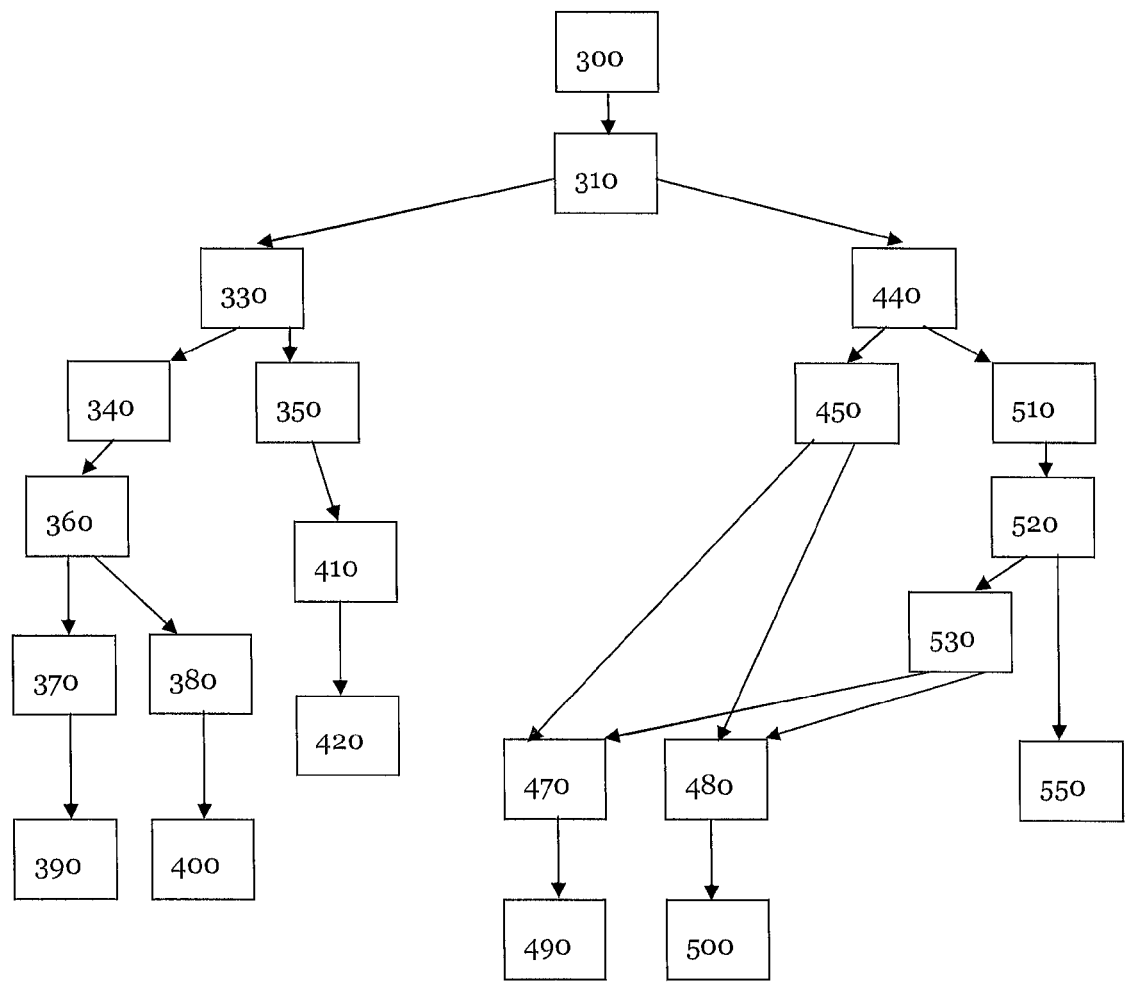
Figure 3:
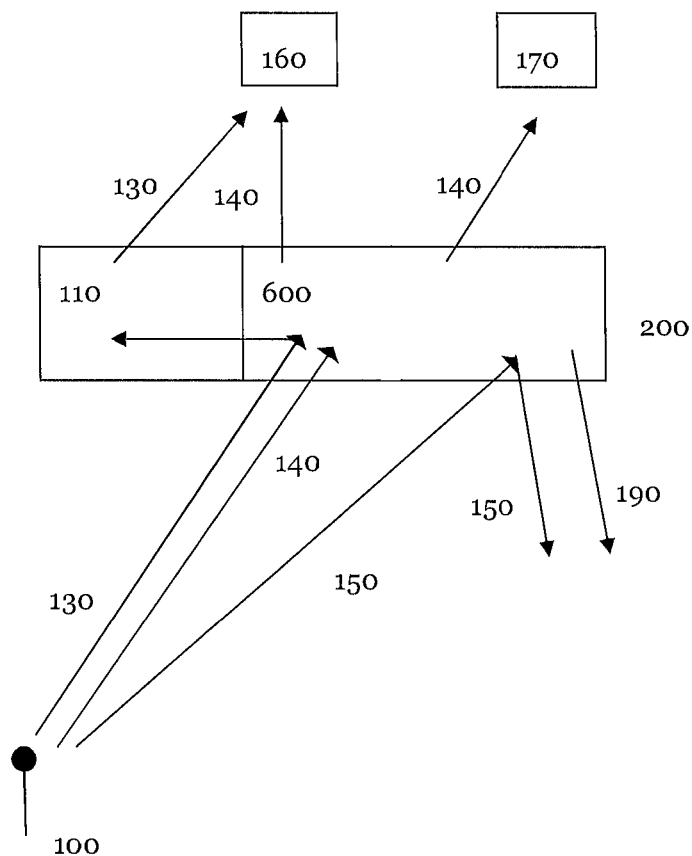

In the following, aspects of the present invention will be further discussed with reference of the accompanying figures. The figures show:

FIG. 1: a schematic drawing of the method according to the present invention;

FIG. 2: a flow chart according to an implementation of the method according to the present invention; and FIG. 3: a schematic drawing of a preferred embodiment of the present invention.

5. DETAILED DESCRIPTION OF PREFERRED EMBODIMENTS

FIG. 1 shows a possible embodiment of the present invention. A mobile communication device 200 comprises a protected storage area 110. Different embodiments are also conceivable. The mobile communication device could comprise a single protected storage area. It is further conceivable that the mobile communication device comprises at least one unprotected storage area and at least one protected storage area. Depending on the respective subscriber identification 130, 140, 150, incoming calls from the wireless network 100 are stored into the protected storage area 110 or directly put through to the user of the telephone 160, 170. A communication 130 related to a subscriber identification which is assigned to a confidential contact, e.g., a business partner, will be stored directly into the protected storage area 110 without visible indication at the mobile communication device.

An authorized user 160 may subsequently access this information. The access can be realized by different means such as entering a PIN-code, using a finger-print or an Iris recognition.

Incoming communication 140 of a caller who is not assigned to a confidential group could be directly put through to user 160. The same applies to an unknown subscriber identification 150, e.g., if the subscriber identification is not transmitted.

In this way, only the authorized user 160 would know about incoming private messages 130, e.g., SMS, MMS and also voice messages. Unauthorized users 170, e.g., all other users of the mobile communication device 200 who are not authorized to access the protected storage area 110 may use the mobile communication device in a regular way. According to FIG. 1, incoming communication 140 or 150 is displayed on the mobile communication device as usual. In this way, it is possible to use the mobile communication device 200 in a conventional manner. However, private messages 130 are only visible to and accessible by the authorized user 160. Moreover, it is possible that, e.g., a symbol may be displayed on the display of the mobile communication device 200 wherein the symbol indicates an incoming private message 130.

In the following, the invention will be explained with reference to FIG. 2 of the present application. In step 300, a communication attempt (e.g., SMS, MMS, call) occurs. Now it is crucial whether the mobile communication device 200 (cf. FIG. 1) is activated or not, cf. step 310.

If the mobile communication device 200 is activated, the further procedure depends on whether the protected storage area 110 is activated 440 or not. If the protected storage area 110 is not activated 450 any incoming communication is treated as known in the art. If the mobile communication device 200 is set to silent mode 480, a message or a symbol may be displayed on the display whereby the user is informed about incoming communication 500. If the mobile communication device 200 is not set to silent mode 470, the user is informed about the incoming communication by means of a normal signal 490. In other words, the mobile communication device 200 may be used without any restrictions.

However, if the protected storage area 110 is activated 510, incoming communication may be handled in a different way. If the incoming communication is considered as being "private" 520 there will be no hint at the mobile communication device 200 about that connection attempt. The incoming communication is then automatically stored into the protected storage area 110 and remains invisible unless it is fetched by the authorized user 550. Incoming communication that is not deemed to be "private" is treated 530 just as normal communication, i.e., according to steps 470, 480.

However, if the mobile communication device 200 is not activated 310, it depends on whether the protected storage area 110 is activated or not, step 330. If the protected storage area 110 is activated 350, identified communication that is deemed to be "private" will be directly moved into the protected storage area 110, 410. An authorized user could then fetch the information 420 after activating the mobile communication device 200. However, this will be possible only if access to this information is granted which depends on the authorization according to the aspects discussed herein.

Should the protected storage area not be activated 340, any incoming communication will be treated as conventionally known and, e.g., forwarded into the regular mailbox 380 if the mailbox is activated 360. In this case, the mobile device 200 may display information about the missed communication, e.g., on the display of the mobile communication device 400. However, that is particularly dangerous for confidential information since it is not protected. If the mailbox is not activated 370, the mobile communication device 200 will display a notification about the missed communication 390. This might also be dangerous since already the publication of the subscriber identification could provide confidential information. A further risk can be seen in the delayed delivery of short messages (e.g. SMS, MMS) since it is directly displayed at the mobile communication device 200 and not protected if the protected storage area is not activated.

FIG. 3 illustrates a further preferred embodiment of the present invention. The illustrated embodiment generally relates to that of FIG. 1.

However, the apparatus additionally comprises a selective filter 600 that filters incoming communication depending on the respective subscriber identification. A first incoming communication 130 is deemed to be "private" by the selective filter 600 and then moved into the protected storage area 110. From there it may be fetched by the authorized user 160, e.g., after entering a PIN-code, finger-print or other biometric methods or any other suitable method.

A second incoming communication 140 that is not deemed to be private by selective filter 600 but nonetheless accepted will be treated as conventional communication by the mobile communication device 200. The communication may be indicated via a ring tone in the case of an incoming call or any other suitable signal or/and message. The communication could be accessed by all users 160, 170 of the mobile communication device 200.

A third incoming communication 150 could be classified by the selective filter 600 as being "unwelcome". This could lead to a rejection of the incoming communication 150. The invention further allows to transmit a message to the other participant. Such message could inform the other participant that the requested participant is unavailable for a certain period of time or that he may be reached via a different subscriber identification.

As already explained above, the activation and deactivation, respectively, of the protected storage area may only be carried out by the authorized user. The authorization can be achieved by a password, a finger-print or any other suitable method.

According to another particular advantage of the present invention, the telephone number need not be protected as it is generally the case, e.g., for politicians or other VIPs. Moreover, it is not necessary to own multiple mobile communication devices since the invention provides an exact control over accepted contacts. It is the user himself who controls the communication and thus decides when he may be reached and by whom.

Moreover, it is possible to implement an inverse function in the mobile communication device 200. For instance, it is conceivable that the apparatus of the present invention could be used as some kind of child-proof lock. Parents could block outgoing communication that satisfies a specific criterion, e.g., specific telephone numbers, either generally or during specific times (e.g., in the evening). In this way, only predefined communication may be initiated from the respective mobile communication device 200, 190. This may reduce the dependency or even addiction to the mobile communication device 200 which could, e.g., enhance the ability of the children to concentrate better. Moreover, it is, e.g., conceivable, that all foreign area codes could be blocked in order to reduce costs. Another option could be the limitation of outgoing data transfers in order to reduce costs. Moreover, it is also possible to store all contact attempts into the protected area. Activating such "protections" is only possible after entering the authorization code, e.g. by the parents.

The means for realizing the present invention as method, apparatus or system could be comprised of hardware, software or any combination thereof. The means can further comprise circuits, modules, integrated chips or different storage media (e.g., flash-storage, CD-ROM, DVD, smart cards, memory sticks) or any arbitrary combination thereof. Moreover, all properties mentioned in the dependent claims could be completely or partially realized by means of software. Mobile communication devices could be any type of devices that are suitable for sending and/or receiving mobile communication, e.g., cellular phones, smartphones, tablet PCs and so on. The present invention is independent of the underlying cellular communication technology.

The invention claimed is:

1. Apparatus for a mobile communication device comprising a protected storage area, wherein the apparatus comprises a processor and a memory coupled to the processor, wherein the memory comprises program instructions executable by the processor to implement the method comprising:
   a. detecting a unique subscriber identification of an incoming communication;
   b. storing the incoming communication into the protected storage area of the mobile communication device if the subscriber identification fulfills at least one specific criterion;
   c. putting through the incoming communication if at least one specific criterion is fulfilled, wherein the at least one criterion for storing and/or putting through the incoming communication is based on a detection of the frequency of contact and/or a location;
   d. detecting a unique subscriber identification of an outgoing communication; and e. storing the outgoing communication into the protected storage area of the mobile communication device, if the subscriber identification fulfills at least one specific criterion.

2. Apparatus according to claim 1, wherein the subscriber identification is a telephone number.

3. Apparatus according to claim 1, wherein the incoming communication is a phone call.

4. Apparatus according to claim 1, wherein the incoming communication is a short message.

5. Apparatus according to claim 1, wherein the access to the protected storage area is protected by a password.

6. Apparatus according to claim 1, wherein the access to the protected storage area is protected by a finger print.

7. Apparatus according to claim 1, wherein the protected storage area comprises a mailbox for voice messages.

8. Apparatus according to claim 1, wherein the at least one criterion for storing and/or putting through the incoming communication depends on a date.

9. Apparatus according to claim 1, wherein the at least one criterion for storing and/or putting through the incoming communication depends on the location of the receiving mobile communication device.

10. Apparatus according to claim 1, wherein a message is sent to a user associated with the unique subscriber identification.

11. Apparatus according to claim 1, wherein the at least one criterion for storing and/or putting through the incoming communication is based on a priority classification.

12. Apparatus according to claim 1, wherein the apparatus is not located on the mobile communication device.

13. Apparatus according to claim 1, wherein the apparatus is further adapted to limit outgoing communication based on time and/or area code and/or blocked subscriber identifications and/or the frequency of contact.

14. Computer program residing on a non-transitory computer readable medium of a mobile communication device, wherein the program instructions are configured to implement:
   a. detecting a unique subscriber identification of an incoming communication;
   b. storing the incoming communication into a protected storage area of the mobile communication device, if the subscriber identification fulfills at least one specific criterion;
   c. putting through incoming communication, if at least one specific criterion is fulfilled; wherein the at least one criterion for storing and/or putting through the incoming communication is based on a detection of the frequency of contact and/or a location;
   d. detecting a unique subscriber identification of an outgoing communication; and
   e. storing the outgoing communication into a protected storage area of the mobile communication device, if the subscriber identification fulfills at least one specific criterion.

* * * * *